US00RE33892E

United States Patent [19]

Sims

[11] E Patent Number: Re. 33,892

[45] Reissued Date of Patent: Apr. 21, 1992

[54] TIRE BEAD BREAKER

[75] Inventor: Douglas A. Sims, Attadale, Australia

[73] Assignee: Freezone Pty Ltd, Western Australia, Australia

[21] Appl. No.: 629,837

[22] Filed: Dec. 19, 1990

Related U.S. Patent Documents

Reissue of:

[64] Patent No.: 9,137,706
Issued: Apr. 3, 1990
Appl. No.: 278,824
Filed: Dec. 2, 1988

Related U.S. Application Data

[63] Continuation of PCT/AU88/00106, Apr. 15, 1988.

[30] Foreign Application Priority Data

Apr. 15, 1987 [AU] Australia ..... PI 1460
Sep. 10, 1987 [AU] Australia ..... PI 4270

[51] Int. Cl.[5] ..... B60C 25/07
[52] U.S. Cl. ..... 157/1.17
[58] Field of Search ..... 157/1.1, 1.17

[56] References Cited

U.S. PATENT DOCUMENTS 3,693,692 9/1972 Branick ..... 157/1.17
3,847,197 11/1974 Konen .
3,880,220 2/1975 Bunts .
4,256,161 3/1981 Chisum ..... 157/1.17
4,415,014 11/1983 Durpin .
4,589,462 5/1986 Giles ..... 157/1.17
4,785,865 11/1988 Folstad ..... 157/1.17
4,787,433 11/1988 Thomas ..... 157/1.17

FOREIGN PATENT DOCUMENTS 224043 2/1958 Australia .
437200 10/1970 Australia .
1058360 3/1954 France .

*Primary Examiner*—D. S. Meislin
*Attorney, Agent, or Firm*—Reising, Ethington, Barnard, Perry & Milton

[57] ABSTRACT

A tire bead breaker (10) for use in removing a tire bead (30) from engagement with a rim (22) of a wheel hub (24). The tire bead breaker (10) includes: a sleeve (12) having a tine (32) depending therefrom. The tine (32) tapers in a direction away from the sleeve (12) and is dimensioned to be forceable between a wall (26) of the tire (28) adjacent the tire (28) and the rim (22) of the wheel hub (24). The tine (32) is disposed substantially othogonal to an axis of the sleeve (12). A post (14) is dimensioned to fit in the sleeve (12) and is capable of longitudinal movement therein. Two or more tongues (18) depend from the post (14) in a spaced apart manner and the tongues (18) are disposed substantially orthogonal to an axis of the post (14). The tongues (18) define a recess into which the tine (22) is capable of fitting and the tongues (18) are disposable between the wall (26) of the tire (28) adjacent the tire bead (30) and the rim (22) of the wheel hub (24). A clamp (46) is attached to the sleeve (12) and has an over-center locking lever (68) to releasably lock the tine (32) onto the rim (22) of the wheel hub (24). A drive (74) is disposed between the sleeve (12) and the post (14) to urge the two tongues (18) away from the tine (32) so as to force the tire bead (30) off the rim (22).

11 Claims, 8 Drawing Sheets

TIRE BEAD BREAKER

Matter enclosed in heavy brackets [ ] appears in the original patent but forms no part of this reissue specification; matter printed in italics indicates the additions made by reissue.

*RELATED APPLICATIONS*

*This application is a continuation of an International application filed under the Patent Cooperation Treaty bearing application Ser. No. PCT/AU88/00106, filed Apr. 15, 1988, and published as WO88/07942, Oct. 20, 1988, which lists the United States as a designated country.*

DESCRIPTION

The present invention relates to a tire bead breaker particularly envisaged for use in removing a bead edge of a pneumatic tire from engagement with a rim of a wheel.

FIELD OF THE INVENTION

In general, a pneumatic tire is removed from a rim of a wheel with a manual bead breaker or with an pneumatically or hydraulically driven bead breaker. In the former case the bead breaker takes the form of a metal shaft having a wedge shaped end and a capped sleeve fitted about the shaft and used as a ram to force the wedge shaped end between the tire rim and a side wall of the tire adjacent the bead edge. The problem with such bead breakers is that the natural resilience of the tire absorbs much of the force imparted by the sleeve, thus reducing the efficiency of the bead breaker. Such is particularly true of larger tires such as truck and tractor tires. In the latter case two pneumatically or hydraulically driven rams pinch the tire adjacent the rim of the wheel to force the bead of the tire off the rim of the wheel. Such bead breakers are generally not portable or are difficult to transport for use on site and are expensive. In some case tires are removed from wheels whilst the wheel is fixed to a vehicle. Such is true on large tractors and results in limited ability of the abovementioned forms of bead breakers, particularly in the case of dual wheeled axles.

Mechanical bead breakers of a portable nature have been proposed but generally experience difficulty in attachment to the rim of the wheel or in forcing between the tire wall adjacent the bead edge and the rim.

SUMMARY OF THE INVENTION

The present invention provides a tire bead breaker which at least partly overcomes the problems of the above prior art. In accordance with one aspect of the present invention there is provided a tire bead breaker for use in removing a tire bead from engagement with a rim of a wheel, the tire bead breaker characterized in that it comprises:

(a) a sleeve having a time depending the tine tapering in a direction away from the sleeve, the tine being dimensioned to be forceeable between a wall of the tire adjacent the tire and the rim of the wheel, the tine being disposed substantially orthogonal to an axis of the sleeve;

(b) a post dimensioned to fit in the sleeve and capable of longitudinal movement therein;

(c) two or more tongues depending from the post in spaced apart manner, the tongues being disposed substantially orthogonal to an axis of the post, the tongues defining a recess into which the tine is capable of fitting, the tongues being disposable between the wall of the tire adjacent the tire bead and the rim of the wheel;

(d) a clamp means attached to the sleeve, the clamp means having an over-centre locking lever to releasably lock the tine onto the rim of the wheel; and (e) a drive means disposed between the sleeve and the post to urge the two tongues away from the tine so as to force the tire bead off the rim.

BRIEF DESCRIPTION OF THE DRAWINGS

The present invention will now be described by way of example, with reference to the accompanying drawings in which:

FIG. 4 is an exploded side view of the tire bead breaker of FIG. 2a.

DESCRIPTION OF THE INVENTION

Figure 1A:
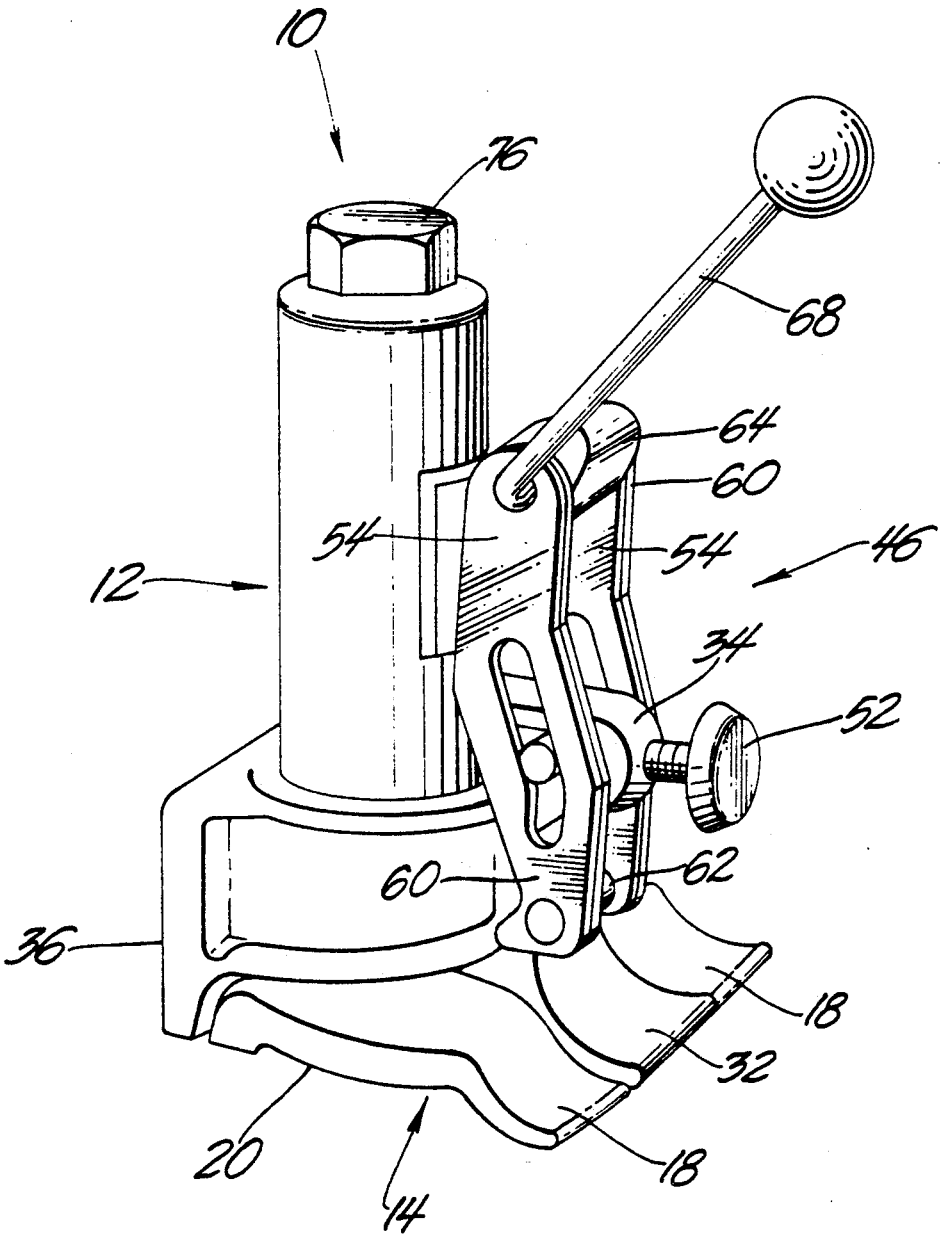
FIGS. 1a, 1b, 1c are an upper perspective view, a front view and a lower plan view, respectively, of a tire bead breaker in accordance with the present invention.

In FIGS. 1 to 4, there is shown a tire bead breaker 10 comprising a sleeve 12 and a post 14 dimensioned to fit in the sleeve 12 and capable of longitudinal movement therein. The post 14 comprises two tongues 18 of wedge shape and spaced apart upon a base 20 to define a recess.

The two tongues are disposed substantially orthogonal to an axis of the post 14.

Figure 1C:
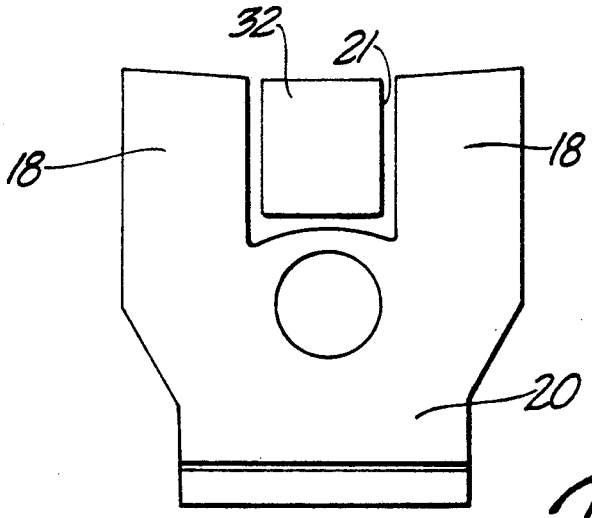
Figure 2A:
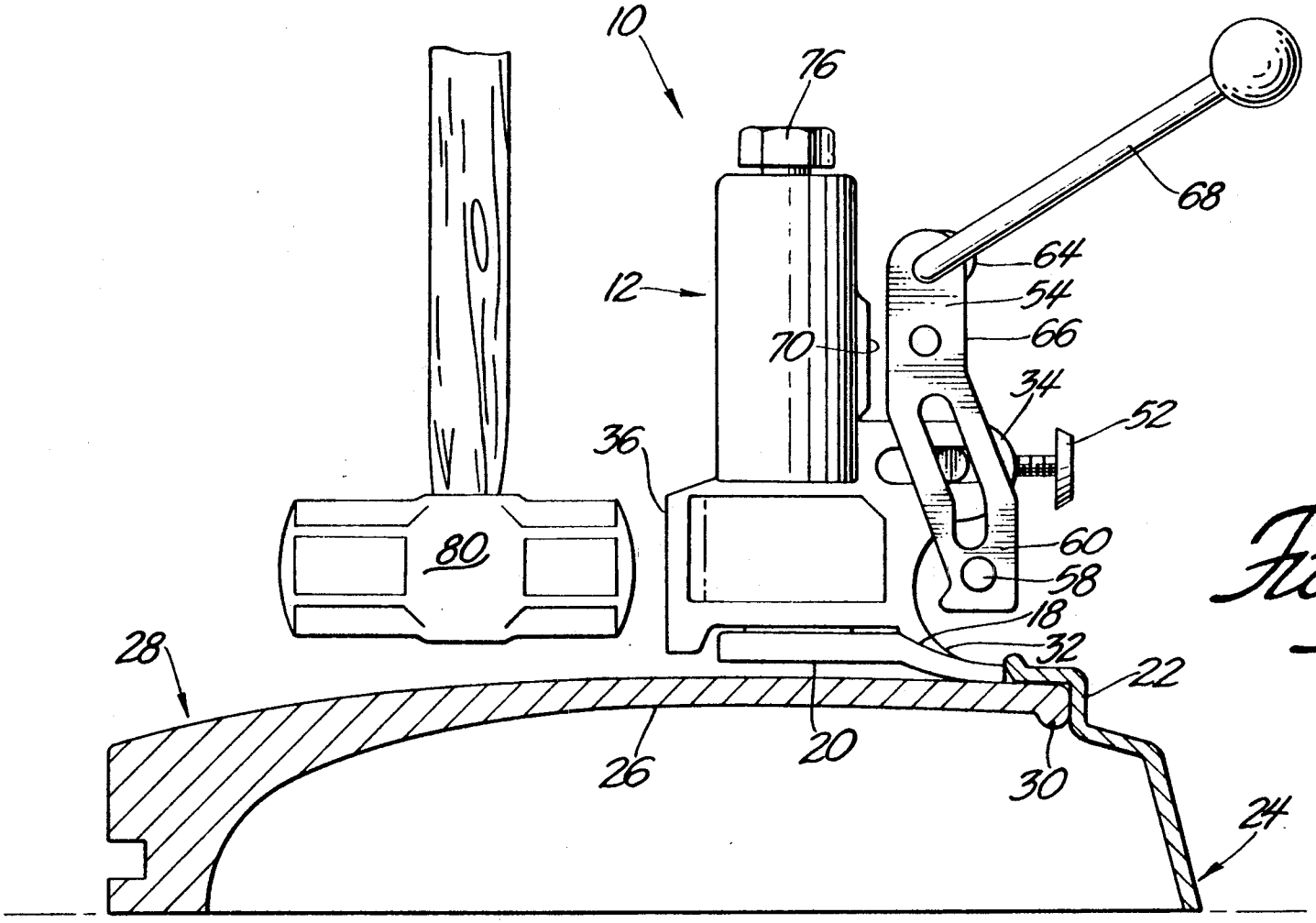
FIGS. 2a, 2b, and 2c are side views of the tire bead breaker of FIGS. 1a, 1b, and 1c shown in use forcing a bead edge of a tire of a rim of a wheel.
Figure 2B:
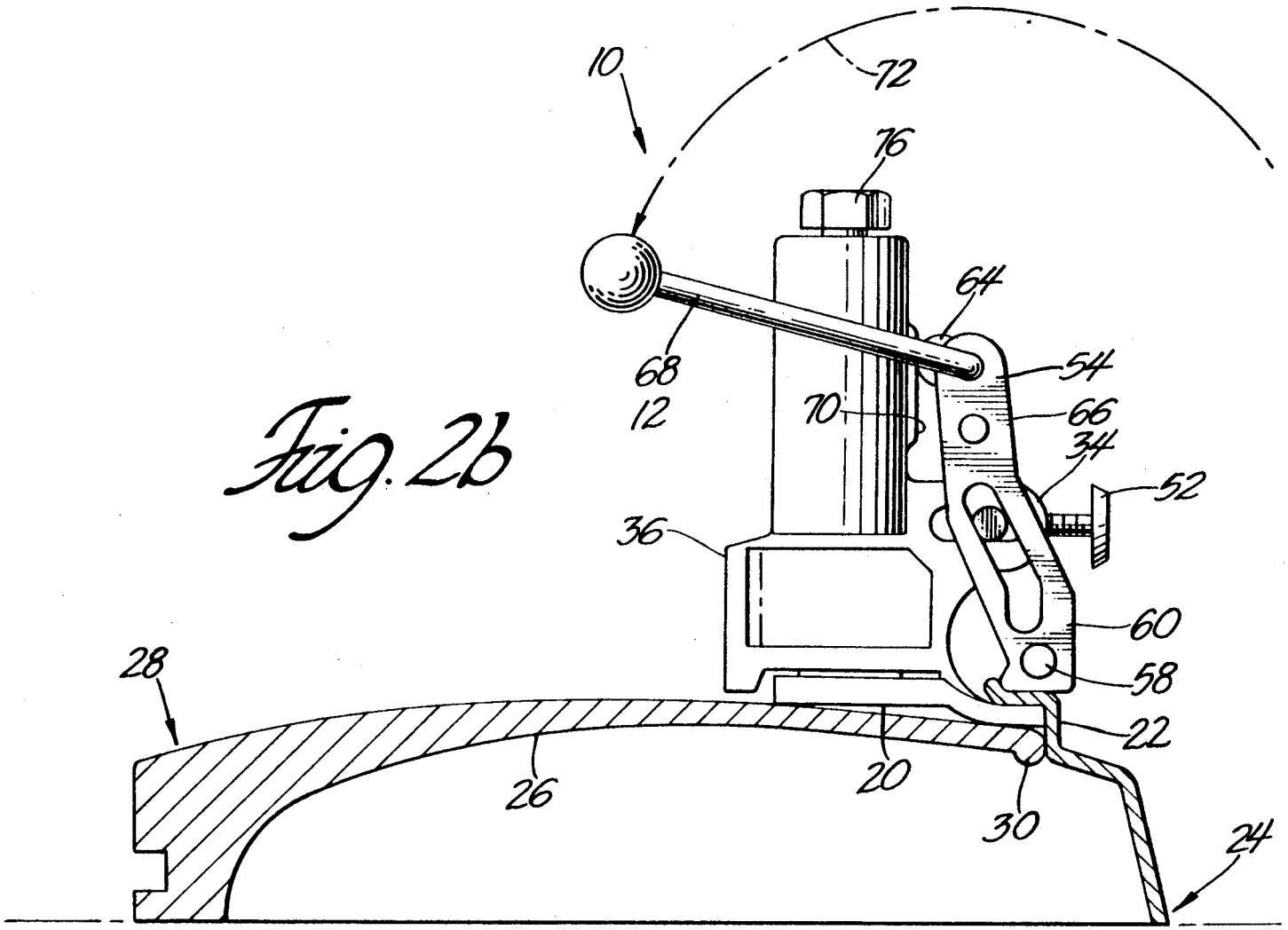
Figure 2C:
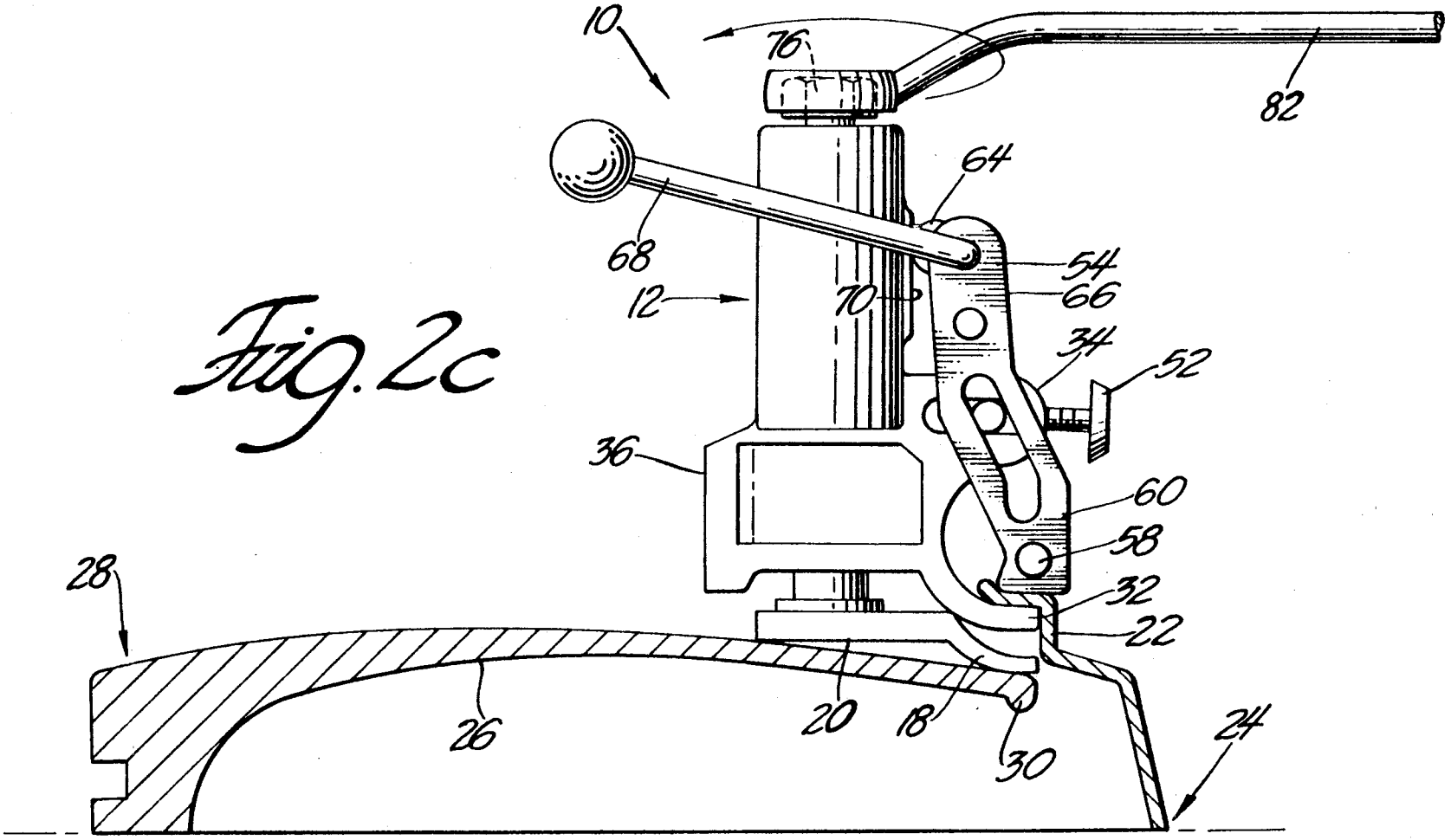

The tongues 18 are arranged to be placed between a rim 23 of a wheel 24 and a side wall 26 of a tire 28 adjacent a bead edge 30 of the tire 28, as shown in FIGS. 2a to 2c. It has been found preferable to use two tongues 18 since such results in a wider arc of contact with the side wall 26 of the tire 28. As shown in FIG. 1c the tongues 18 are angled at a leading edge thereof so as to define an arc similar to the curvation of the rim 22. For example, the arc could be of radius of about 450 mm. It is to be understood that the leading edges need not be smoothly curved.

Figure 3:
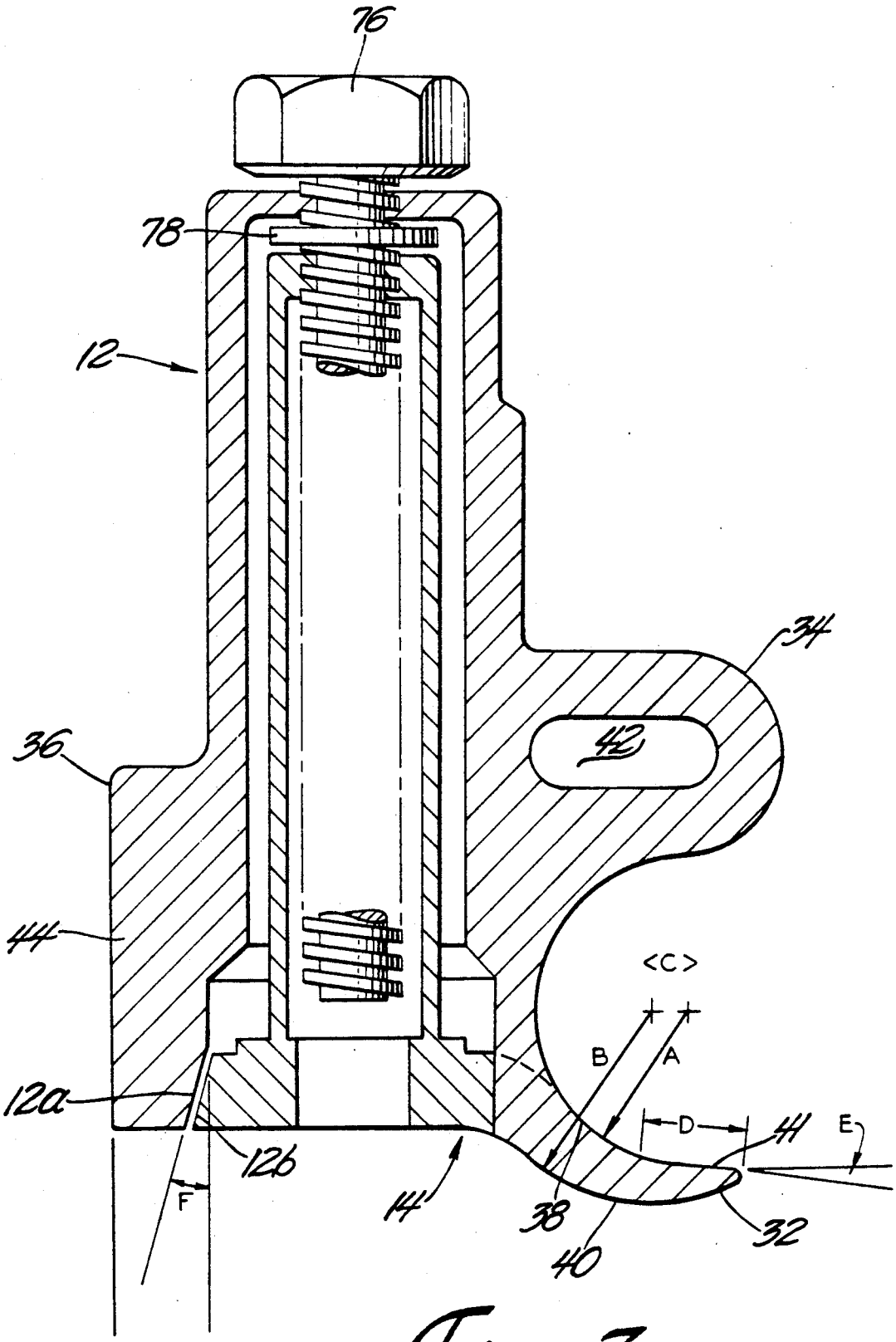
FIG. 3 is a cross-sectional side view of a part of the tire bead breaker of FIG. 2a, showing preferred dimensions.

Particularly as shown in FIG. 3, the sleeve 12 is hollow and comprises a tine 32 disposed outwardly from one end with a knob 34 located adjacent thereto and intermediate of the length of the sleeve. The sleeve 12 also comprises a foot 36 depending in a direction opposite to the tine 32. The tine 32 is disposable between the tongues 18 in the recess 21. As shown in FIG. 1b the tine 32 preferably stands proud of the tongues 18. Typically, the tine 32 is about 4 mm thicker than the tongues 18. Such is preferred to ensure that the tine 32 forces between the side wall 26 adjacent the bead edge 30 and the rim 22. By such the tongues 18 have little contact with both the tire wall 26 and the rim 22, which is advantageous as described hereinafter.

As shown in FIG. 3 the tine 32 has certain preferred dimensions A, B, C, D and E. Dimensions A and B define a radius of curvature for first and second curved surfaces 38 and 40 defined as segment of circles. Typically the dimensions A and B are about 21 and 27 mm respectively. It has been found that dimensions A is quite critical and that it is substantially independent of the rim 22 size. The dimension c is measuured substantially normally to sleeve 12 and defines the displacement between centres of curvature of the first and second curved surfaces 38 and 40. Typically the dimension C is about 5 mm. However, it is to be understood that other values of dimensions B and C could be used for longer rims 22. For example, the dimension B could be up to 40 mm and the dimension C could be up to about 15 mm. The dimension D defines the length of a substantially flat surface 41 which terminates the first curved surface 38 and is disposed substantially tangentially thereto and meets the second curved surface 40. Typically the dimension D is about 16 mm. It is envisaged that the length of dimension D could be increased for longer rims 22, such as for example, to 50 mm. In such cases the second curved surface 40 is terminated by a further flat surface. The dimension E defines an angle of tilt for the flat surface 41 from the normal to the sleeve 12. Typically the dimension E is about 5°. It has been found the dimension E is substantially independent of the rim 22 size.

The dimensions A to E have been found to be most preferable in allowing relatively easy insertion of the tine 32 between the tire wall 26 and the rim 22, together with relatively good surface contact between the tine 32 and the rim 22.

Preferably, the tine 32 is of such length, overall, that its end will bear against the rim 22 adjacent the bead edge 30.

The tine 32 is also shaped so that it can be oriented parallel to the wheel 24, in use.

The knob 34 comprises a slot 42 disposed substantially normally to the sleeve 12. The knob 34 also has a threaded hole 43 (FIG. 1b) extending into the slot.

The foot 36 comprises a relatively flat sole 44 disposed substantially parallel to the axis of the sleeve 12 and opposite the tine 32. The sole 44 is preferably configured to be struck by a hammer or the like to drive the tine between the tire wall 26 and the rim 22.

The tire bead breaker 10 also comprises a clamp means 46 pivotally attached to the knob 34.

Figure 4:
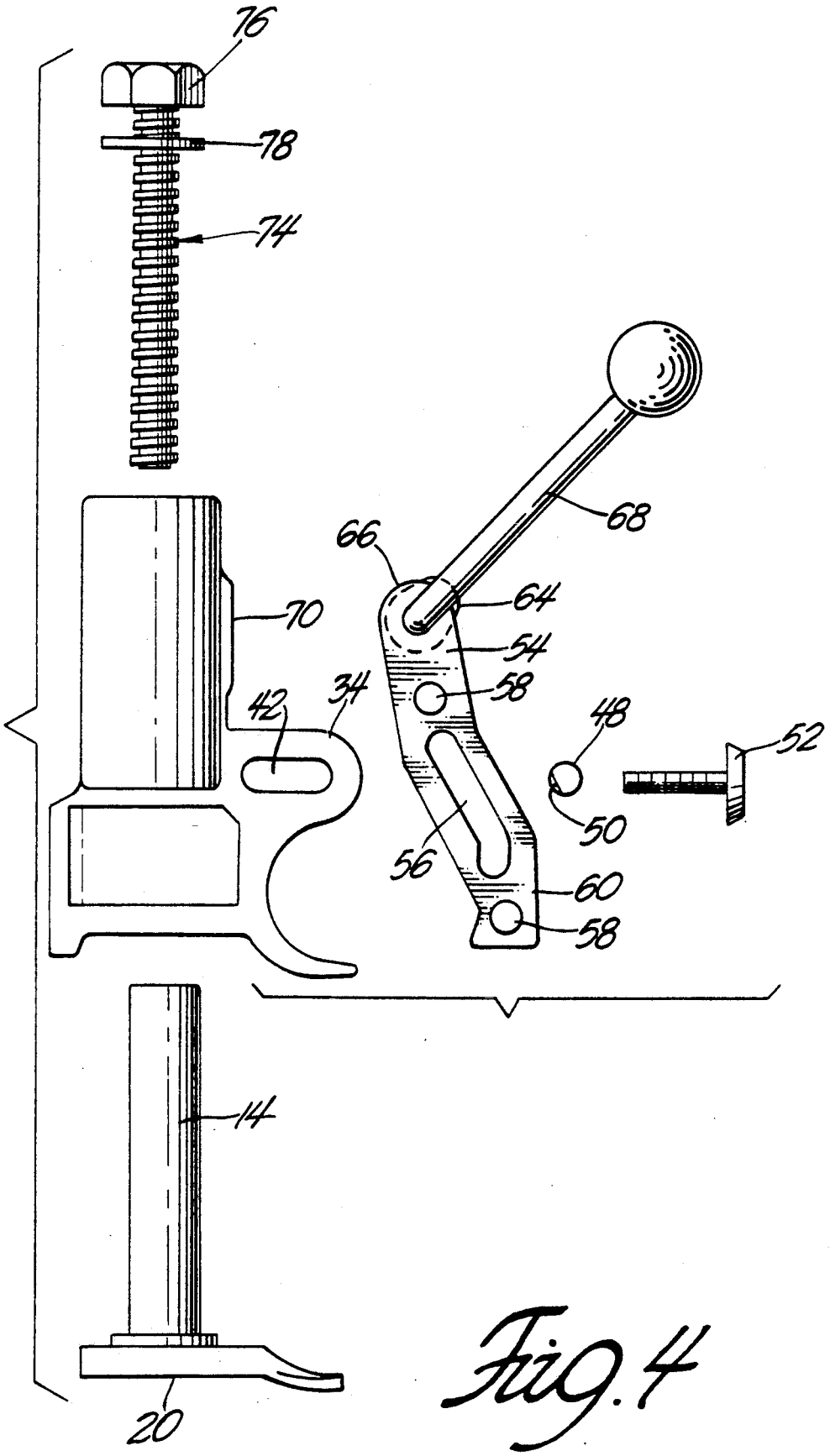

The slot 42 is dimensioned to receive a shouldered rod 48 as shown in FIG. 4. The shouldered rod 48 preferably comprises a flat 50 at each outer end of it.

Figure 1B:
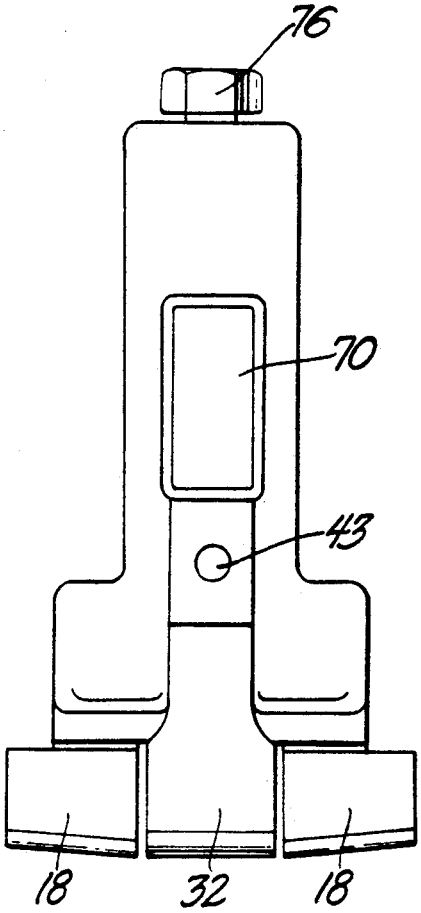

The threaded hole 43 is dimensioned to receive an externally threaded bolt 52 (FIGS. 1a and 4). The bolt 52 is disposed to bear against the rod 48 to urge it slidably along the slot 42 toward the sleeve 12.

The clamp means 46 also comprises at least one, such as for example, two plates 54 fitted about the knob 34 and each comprising an elongated aperture 56 (see FIG. 4). Each of the apertures 56 is dimensioned to receive one of the ends of the rod 48 to pivotally and slidably maintain the plates 54 in relation to the knob 34.

Rivets 58 or the like are used to fix the two plates 54 together about the ends of the rod 48.

At a first end 60 of the plates 54 adjacent the tine 32 is a bar 62 (see FIG. 1a) provided to space the plates 54 apart so as to allow movement of the plates 54 with respect to the knob 34.

The clamp means 46 also comprises an offset cam 64 located at a second end 66 of the plates 54 opposite the rod 48 from the first end 60, The offset cam 64 is provided with respect to the plates 54 and is connected off center to the plates 54 particularly as shown in FIG. 1a.

An overcentre locking [liner] *lever* 68 is fixed to the cam 64 and disposed to be operated to rotate the cam 64 with respect to the plates 54. Preferably, the sleeve 12 has a ridge 70 depending from it adjacent the cam 64 so that the cam 64 may, in use, bear against the ridge 70 to force the plates 54 adjacent the end 66 away from the sleeve 12, since the rod 48 operates as a pivot and results in the end 60 being forced toward the tine 32 as shown in FIG. 2b. During the rotation the flats 50 bear against edges of the apertures 56.

Preferably, the apertures 56 have a bend in them as shown in FIG. 4 so that the plates 54 can be raised clear of the tine 32 to aid in inserting the tine 32 and the tongues 18 between the tire wall 26 and the rim 22 as shown in FIG. 2a.

The [flat] *flats* 50 are preferred to increase the area of contact between the rod 48 and the edges of the apertures 56 to reduce the likelihood of the rods 48 creating pits in the edges of the apertures 56 in use.

Preferably, the plates 54 may be forced into contact with a base of the knob 34 by threading the bolt 52 into the hole 43 to reduce the movement of the plates 54 whilst the tine 32 and the tongues 18 are forced between the tire wall 26 and the rim 22.

It is intended that the lever 68 be pivoted in the direction of arrow 72 (see FIG. 2b) in order to force the end 60 into locking engagement with the rim 22 of the wheel 24.

The tire bead breaker 10 of the present invention also comprises a drive means 74, particularly as shown in FIGS. 3 and 4.

The drive means 52 comprises a threaded bolt 76 journalled with a thrust bearing 78 to an end of the sleeve 12 opposite and threadedly engaged with the post 14. Rotation of the bolt 76 in the sleeve 12 results in displacement of the post 14 with respect to the sleeve 12 and hence displacement of the clamp means 46 with respect to the tongues 18.

It has been found convenient to produce an upward curvature in the tongues 18 such that the tongues 18, when aligned, with the tine 32, scribe a curve having an upward (cupped) aspect. Such curvature has been found to be convenient in driving the tongues 18 and the tine 32 between the tire wall 26 and the rim 22 and to more readily fit to smaller wheel hubs 24.

The sleeve 12 and the post each comprise a bevelled edge 12a and 12b disposed at an angle F to the axis of the sleeve 12. The angle is typically about 15° and is provided to achieve intimate contact between the post 14 and the sleeve 12 during insertion of the tine 32. Such lessens vibration of the post 14 during insertion and assists in transmission of force from the foot 36 to the tine 32.

It is envisaged that the sleeve 12 and the post 14 may be circular in cross-section or rectangular or polygonal or the like.

In use, the tire bead breaker 10 of the present invention is positioned adjacent the junction of the tire wall 26 and the rim 22 of the wheel 24 as shown in FIG. 2a, and with the tine 32 disposed in the recess 21 between the tongue 18. The wheel 24 may be layed flat on the ground or fixed vertically to a vehicle.

The lever 68 is pivoted away from the sleeve 12 and the bolt 52 is threaded into the hole 43 to force the plates 54 into stationary engagement with the base of the knob 34. The tine 32 and the tongues 18 are then driven into the junction by striking the sole 44 of the foot 36 with a hammer 80 or the like.

Once the tongues 18 and the tine 32 are in place the bolt 52 is partly unthreaded from the hole 43 and the plates 54 are lowered so that the rod 48 rests against the straight part of the apertures 56. The bolt 52 is then threaded into the hole 43 a distance desired to achieve engagement of the ends 60 and the plates 54 to the rim 22.

The bead breaker 10 is oriented so as to be substantially parallel to the wheel 24 so as to achieve efficient pushing of the tire 28.

The lever 68 is then pivoted to the condition shown in FIG. 2b at which the cam bears against the ridge 70 and forces the end 66 away from the sleeve 12 and the end 60 toward the tine 32. The latter thus causes locking of the rim 22 between the end 60 and the tine 32.

A spanner 82 or the like is then applied in known manner to a head of the bolt 76 to rotate same as shown in FIG. 2c to urge the post 14 away from the sleeve 12. Accordingly, the tongues 18 are urged away from the clamp means 46 and hence the bead edge 30 of the tire 28 is urged off the rim 22.

Once the bead edge 30 is removed from the rim 22 the tire bead breaker 10 may be removed from the rim by rotating the bolt 76 to draw the post 14 back into the sleeve 12. The clamp means 46 is then released in reverse manner to the above.

Figure 5:
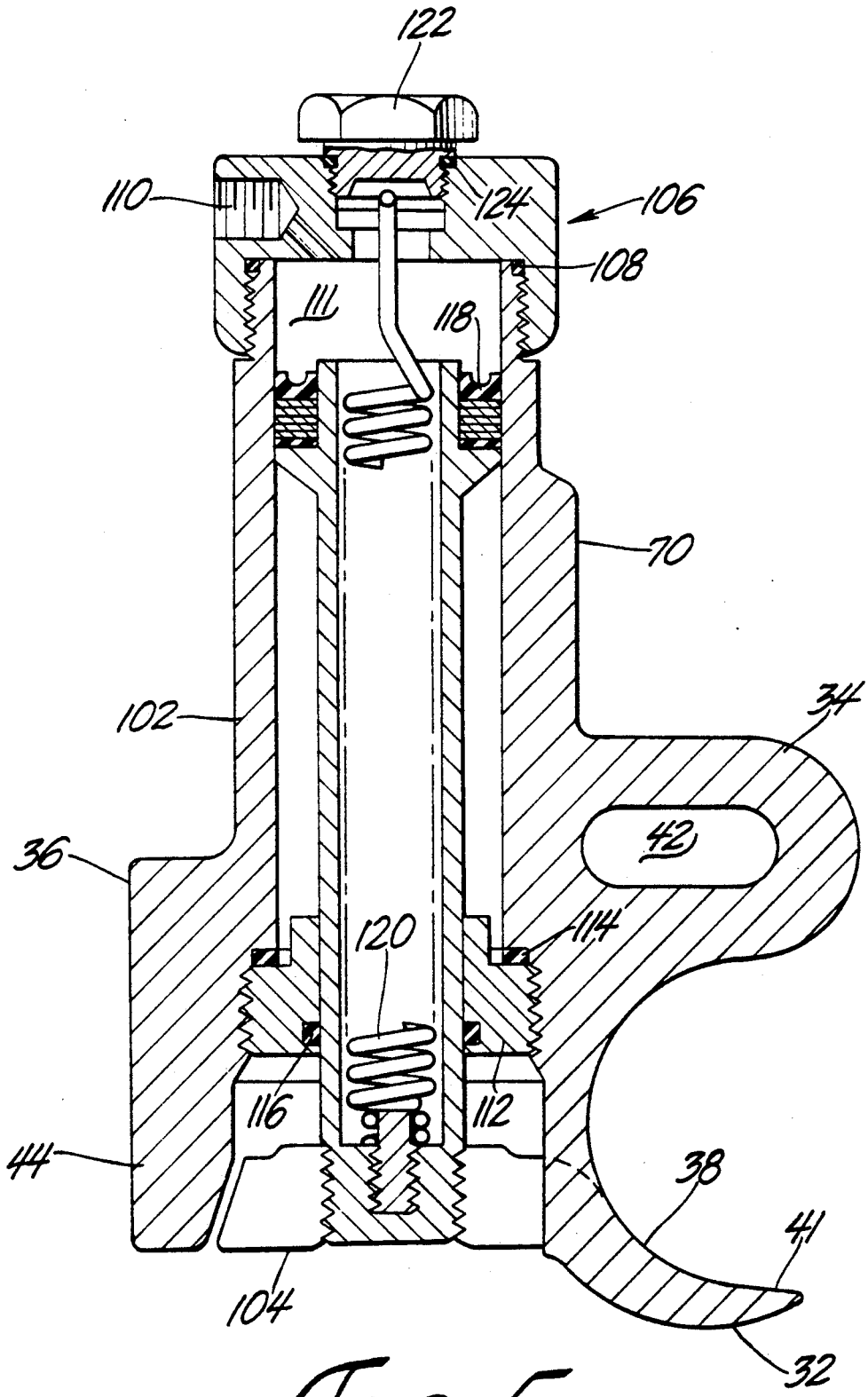
FIG. 5 is a cross-sectional side view of another embodiment of a tire bead braking in accordance with the present invention, shown incorporating a hydraulic ram.

In FIGS. 5 there is shown a tire bead breaker 100 in accordance with another embodiment of the present invention. The bead breaker 100 is similar to that of the bead breaker 10 and the like numerals denote like parts. The clamp means 46 has been removed from FIG. 5 for clarity.

The bead breaker 100 comprises a sleeve 102 and a post 104 similar to those of the previous embodiment except that they define a hydraulic ram which represents the drive means.

The sleeve 102 has a head 106 threadedly connected to it and sealed with an "O" ring 108. The head has a threaded inlet 110 leading into chamber 111 in the sleeve 102 and intended to be connected to a supply of hydraulic fluid, such as, for example, a hand operated hydraulic fluid pump. The bead breaker 100 also comprises an annular bung 112 sealed by "O" rings 114 and 116 between the sleeve 102 and the post 104 to allow sealed sliding movement of the post 104.

The post 104 comprises an annular seat 118 to seal it against the sleeve 102. The chamber 111 is defined by the seat 118 the sleeve 102 and the head 106.

A tension spring 120 is attached to a plug 122 threaded into the head 106 and sealed with an "O" ring 124. Another end of the spring 120 is attached to the post 104.

In use, the bead breaker 100 is operated similarly to the bead breaker 10 except that the sleeve 102 and the post 104 are driven apart by pumping the hydraulic pump to force hydraulic fluid into the chamber 111 and hence the seat 118 toward the tine 32.

[One] *Once* the tire bead 30 is off the rim 22 the pump is released and an arc way valve therein operated to allow fluid to return thereto. The spring 120 then retracts to force the hydraulic fluid from the chamber 111.

By virtue of the tire bead breaker 10, 100 of the present invention a tire 28 may be removed from a rim 22 by a single operator using hammer 80, and a spanner 82 (for the tire bead breaker 10) or a hand operated hydraulic fluid pump (for the tire bead breaker 100). The tire bead breaker 10, 100 is relatively small, relatively light and readily transportable.

Further, the tire bead breaker 10, 100 may be used on rims 22 of differing sizes such as from car rims to tractor rims.

The tire bead breaker 10, 100 may also be used to assist an operator in putting a replacement tire onto a wheel hub by clamping an off side of the tire with respect to the rim whilst the operator uses a tire lever a near side of the tire onto the wheel.

In general, the tire bead breaker 10, 100 of the present invention may be used to assist a single operator in removing or refitting a tire to a rim, whereas many of the prior art bead breakers of the manual type require at least two operators and much time and effort to achieve the similar results.

Modifications and variations such as would be apparent to a skilled addressee are deemed within the scope of the present invention. For example, a hydraulic ram could be fitted in the sleeve 112 and attached to the post 104 to obviate the need for a separate hydraulic pump or power source.

I claim:

1. A tire bead breaker for use in removing a tire bead from engagement with a rim of a wheel, the tire bead breaker comprising:

(a) a sleeve having a tine depending therefrom, the tine tapering in a direction away from the sleeve, the tine being dimensioned to be forceable between a wall of the tire adjacent the tire and the rim of the wheel, the tine being disposed substantially orthogonal to an axis of the sleeve;

(b) a post dimensioned to fit in the sleeve and capable of longitudinal movement therein;

(c) two or more tongues depending from the post in spaced apart manner, the tongues being disposed substantially orthogonal to an axis of the post, the tongues defining a recess into which the tine is capable of fitting, the tongues being disposed between the wall of the tire adjacent the tire bead and the rim of the wheel;

(d) a clamp means attached to the sleeve, the clamp means having an over-centre locking lever to releaseably lock the tine onto the rim of the wheel;

(e) a drive means disposed between the sleeve and the post to urge the two tongues away from the tine so as to force the tire bead off the rim;

(f) the sleeve comprises a knob extending therefrom adjacent the tine, and the clamp means comprises one or more plates fitted to the knob and capable of movement with respect thereto, the or each plate having a first end disposed adjacent the tine, and said plate being connected to and moveable with the over-centre locking lever such that the over-centre locking lever may urge the first end toward the tine to lock the clamp means to the rim.

2. A tire bead breaker according to claim 1, in which the tine is thicker than the tongues in a direction parallel to the axis of the sleeve for wedging between the wall of the tire adjacent the tire bead and the rim.

3. A tire bead breaker according to claim 1, in which the or each plate is apertured, a rod is provided in sliding engagement with the knob and disposed in the aperture of the or each plate, and a bolt threadedly engaged with the knob, the bolt being disposed to bear against the rod so that threading of the bolt in the knob enables slidable movement of the rod with respect to the knob for altering the displacement of the first end with respect to the tine, and the or each plate having a second end opposite the rod from the first end, to which the over centre locking lever is pivotally attached.

4. A tire bead breaker according to claim 1, in which the or each plate is apertured, a rod comprising a flat is disposed to fit in the aperture of the or each plate, the or each flat being oriented to bear against the or each respective aperture and disposed towards the sleeve, the rod being pivotable in the knob to allow pivoting of the or each plate whilst the respective flats contact the aperture.

5. A tire bead breaker according to claim 1, in which the sleeve comprises a foot depending in a direction opposite to the tine, the foot having a relatively flat sole disposed substantially parallel to the sleeve and opposite the tine, the sole being configured to be struck by a hammer to drive the tine between the side wall of the tire adjacent the bead edge and the rim of the wheel.

6. A tire bead breaker according to claim 1, in which the tongues are angled at a leading edge so as to define an arc together with the tine, the leading edge lying in a plane substantially at right angles to the axis of the sleeve.

7. A tire bead breaker according to claim 1, in which the tine has an angle of tilt measure with respect to the sleeve, the angle of tilt being about 5°.

8. A tire bead breaker according to claim 1, in which the tine has a first curved surface and a second curved surface, the first curved surface having a curvature defined by a segment of a circle of radius of about 21 mm, and the second curved surface having a curvature defined by a segment of a circle of radius between 27 mm to 40 mm, the centers of curvature of the first and second curved surface being displaced substantially normally to the sleeve by a distance of between 5 mm to 15 mm, the first curve surface being terminated by a relatively flat surface disposed tangentially thereto and meeting with the second curved surface and having a length of between 16 mm to 50 mm.

9. A tire bead breaker according to claim 1, in which the sleeve has a bevelled edge opposite the tine, the hollow post having a base with similarly bevelled edge disposed to meet with the bevelled edge of the sleeve, the bevelled edges meeting to maintain the hollow post rigid with the sleeve during insertion of the tine and the tongues between the side wall of the tire adjacent the bead edge and the rim.

10. A tire bead breaker according to claim 2 in which the drive means is a bolt, journalled to the sleeve and threadedly engaged with the post.

11. A tire bead breaker according to claim 1, in which the drive means is a hydraulic ram formed by the sleeve and the post and sealed to accept hydraulic fluid therebetween to drive same apart.

* * * * *